Oct. 23, 1956   J. S. SENEY   2,767,576
YARN TENSIOMETER
Filed Sept. 14, 1953   2 Sheets-Sheet 1
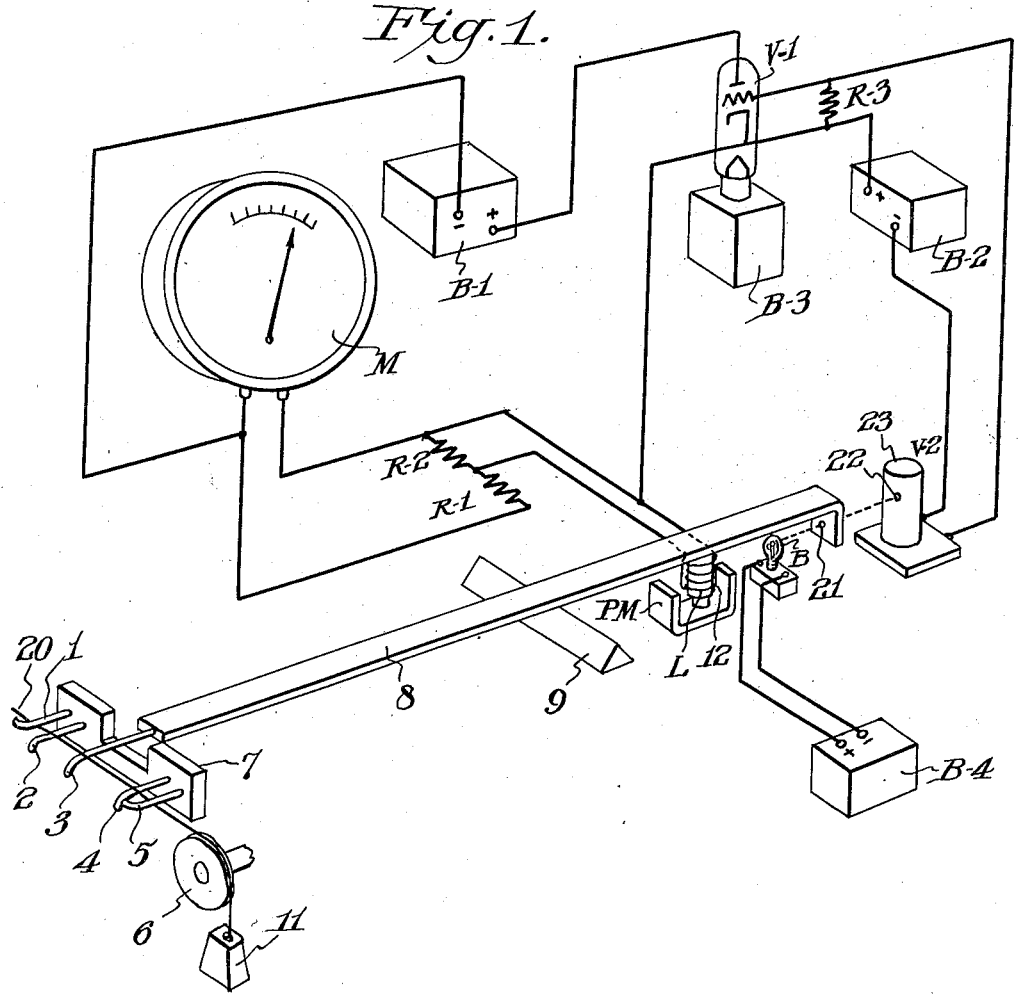
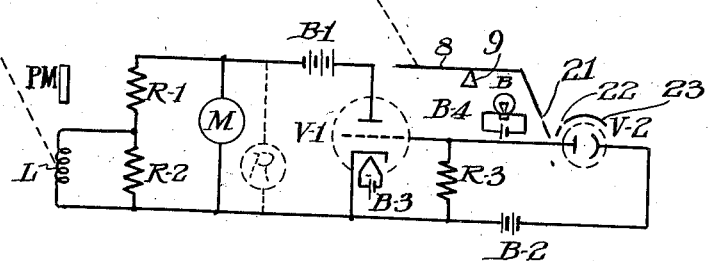
INVENTOR
JOHN S. SENEY
BY Charles A. McClure
ATTORNEY Oct. 23, 1956 J. S. SENEY 2,767,576
YARN TENSIOMETER
Filed Sept. 14, 1953 2 Sheets-Sheet 2
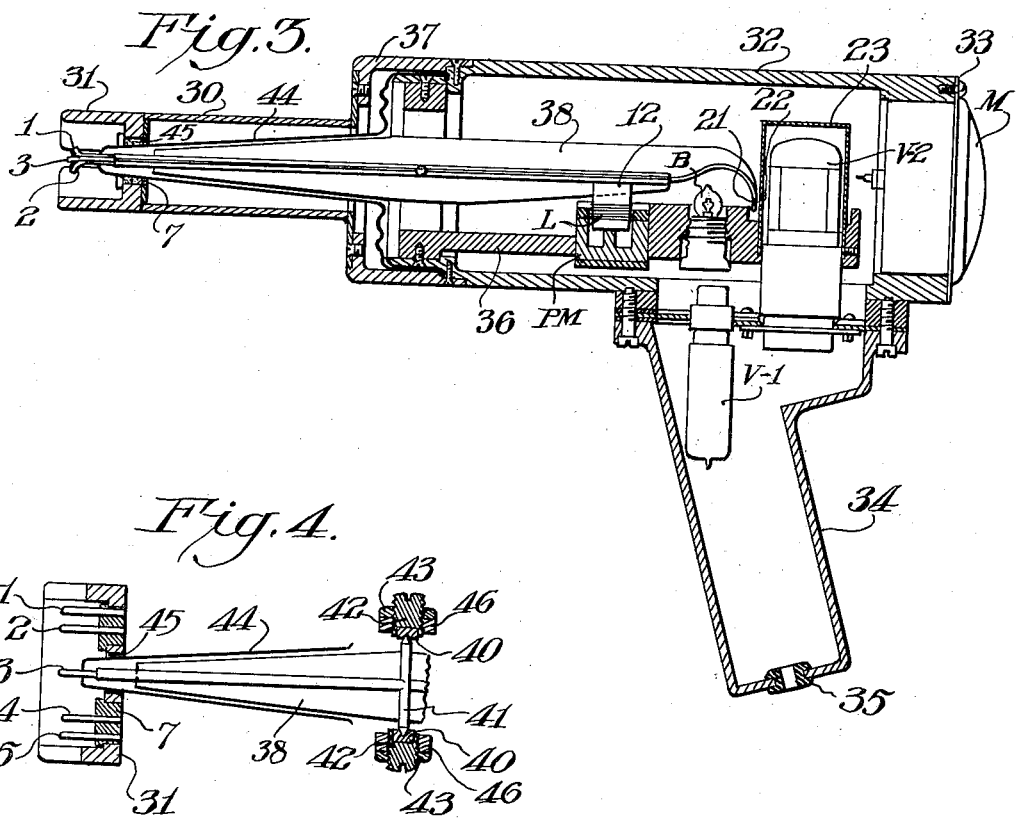
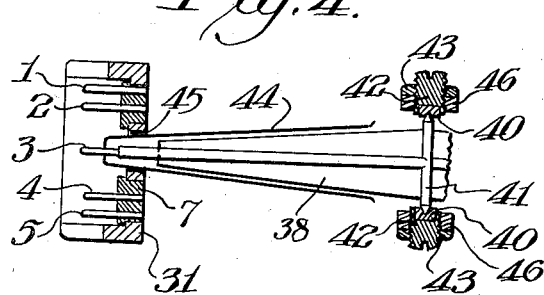
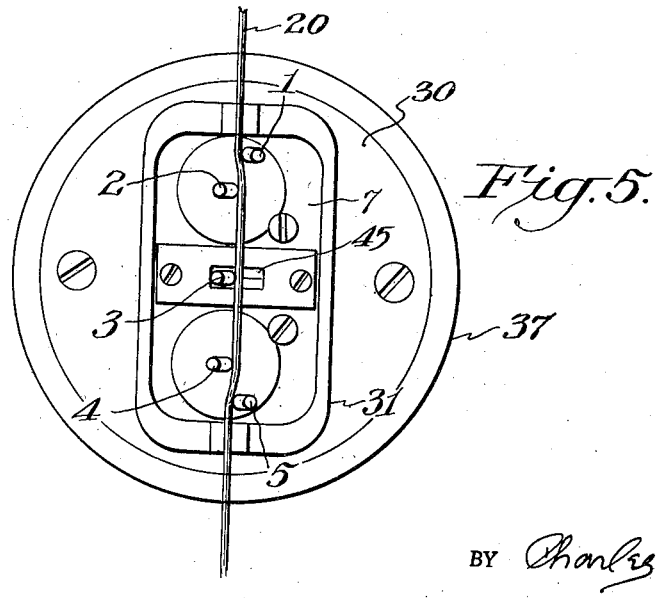
INVENTOR
JOHN S. SENEY
BY Charles A. McClure
ATTORNEY

United States Patent Office 2,767,576
Patented Oct. 23, 1956

2,767,576

YARN TENSIOMETER

John S. Seney, Henrico County, Va., assignor to E. I. du Pont de Nemours and Company, Wilmington, Del., a corporation of Delaware Application September 14, 1953, Serial No. 379,995

4 Claims. (Cl. 73—144)

This invention relates to measurement of force by determination of displacement produced thereby, particularly measurement of tension in a running strand, and to apparatus for making such measurement.

Especially in the manufacture of synthetic fibers is it desirable to know precisely what force is being applied longitudinally to forward or transport a strand of fibers or filaments, as in winding or other processing. Any measurement of such tensioning force should not require undue contact with or displacement of the strand because of the likelihood of damaging it, particularly in the early stages of formation before its structure is thoroughly stabilized, and because of the accompanying chance of introducing error into the measurement.

A primary object of this invention is precise measurement of tension. Another object is measurement of extensive force applied longitudinally to a material by determination of resistance of the material to transverse displacement. A further object is continuous measurement of tension in a running strand. Still another object is construction of self-balancing electromechanical force-measuring apparatus. Other objects of this invention will be apparent from the following description and the accompanying diagrams.

Figure 1 is a schematic diagram of apparatus of this invention showing electrical and mechanical elements and their interconnections. Figure 2 is a schematic circuit diagram of electrical elements of the apparatus of Figure 1. Figure 3 is a cross-sectional side elevation showing apparatus of this invention assembled in operating position. Figure 4 is a fragmentary cross-sectional plan view of the apparatus of Figure 3. Figure 5 is an end elevation of the apparatus of Figure 3.

According to the present invention, a lever or beam is pivotally balanced so as to be displaceable at one end at the instance of an applied force. At the other end of the beam is an aperture situated between a light-emitting element and a light-sensitive element so that any displacement varies the position of the aperture to alter the amount of light incident upon the sensitive element. Attached to the beam is an electrically conducting coil located in a magnetic field produced by a suitable element nearby. Appropriate circuit elements connect the light-sensitive element to the coil so as to set up an opposing magnetic field sufficient to balance the displacement.

In Figure 1, the beam and associated mechanical elements are shown in operating relationship connected to electrical elements of the apparatus. Beam 8 with fulcrum 9 has pin 3 extending from one end. Flanking the pin and mounted in plate 7 are two pairs of guiding members: guides 1 and 2 on one side of the pin, and guides 4 and 5 on the other side. The guides extend parallel to the pin for most of their length, but the ends of each pair angle away from each other to facilitate insertion of strand 20 between each pair in line with the pin, which may also be curved at the end. The strand is shown as passing also over pulley 6 to be tensioned by weight 11. The other end of the beam is bent so as to place aperture 21 between lamp B and a corresponding aperture 22 in shield 23 surrounding phototube V-2. Coil L carried on form 12 affixed to the beam surrounds the south pole of permanent magnet PM for part of its length. The north poles of the magnet are bent toward the beam but spaced from it sufficiently to allow it to pivot without touching the poles. The lamp is actuated by connection with battery B-4. Phototube V-2 is connected across battery B-2 and resistor R-3 in series. One end of R-3 is tied to the grid of triode V-1; the other end of R-3 joins the cathode of V-1. Connected between plate and cathode of V-1 is the series combination of battery B-1 and meter M. Resistors R-1 and R-2 in series are connected across the meter, and coil L parallels R-2.

A schematic circuit diagram for the elements of Figure 1 appears in Figure 2. Operation of the system is easily understood from this diagram. Grid bias for V-1 is applied as a potential produced by conduction through grid resistor R-3 as prompted by conduction through V-2, which is a conventional phototube supplied by battery B-2. Although shown with only an emitter and a collector, V-2 may have a number of intermediate electrodes (connected to intermediate progressive potentials) for photomultiplication. Plate supply potential for V-1 is applied by battery B-1, and the plate circuit is completed from the negative terminal of B-1 through a combination of elements to the cathode of V-1. These elements are M and, in parallel with it, the combination of R-1 in series with the parallel combination of L and R-2. Battery B-3 supplies the heater for the cathode of V-1 and battery B-4 supplies lamp B; these batteries may be combined to supply both the lamp filament and the tube filament from a single source. The amount of bias of V-1 obviously depends upon the amount of light reaching the cathode of V-2, for which B is the only source. This bias determines the V-1 plate current, part of which passes through coil L. The field of L interacting with the field of the nearby permanent magnet PM applies a force to the beam to oppose displacement about the pivot point.

The values of the circuit elements may be chosen so that with no force applied to the external end of the beam, which carries the pin designed to contact a strand or similar material, the beam is balanced. If the pivot point of the beam passes through its mass center, no current should be allowed to flow through V-1 in the absence of an applied force. The relative positions of the apertures in the internal end of the beam and the phototube shield are adjusted for just sufficient bias to cut off V-1. Any displacement of the beam by tensioning of the strand against the measuring pin has the effect of a shutter, misaligning the apertures to admit less light to V-2 and thus reduce its over-all conduction by decreasing the bias. When this happens, V-1 conducts more heavily, setting up a stronger field in L and increasing the meter reading. The increased field opposes the original displacement so as to counteract the displacing rotation. The system thus is self-balancing. Calibration is accomplished easily by applying different known tensioning weights to a strand in position for measurement and noting the corresponding reading of the meter. Sensitivity of the system may be altered by varying resistor R-2 so as to pass more or less of the R-1 current through L, as well as by initial selection of the various elements.

Because of the great sensitivity of photomultiplier tubes, very little displacement of the beam is required to change the conduction in V-1 from full on to off. For example, using as V-1 a 6AQ5 pentode triode-connected to cut off at about 20 volts grid bias with 300 volts plate potential, and as V-2 a 931A 10-stage photomultiplier with an aperture of 0.002 inch in the shield, plus a nearby PR-7 lamp as light source, the end of a 10-inch beam pivoted at its center need move only a few thousandths of an inch for full-scale response of the meter, indicating a tension of 300 grams. This means that the material producing the displacement is affected only slightly, not enough to abrade the surface of the most delicate yarns or the like or to produce any other damage.

The beam and associated mechanical and electrical components, with the exception of the batteries or equivalent power source, may be mounted most conveniently in a pistol-shaped housing, as shown in Figures 3, 4, and 5. Beam 38, replacing simple schematic beam 8 of the other figures, has similar pin 3 in one end and aperture 21 in the other end. The structure of the beam shows a thin cross of rod or tubular members, including axle 41, surrounded by a curved fuselage for greater rigidity. The guides and the pin on the end of the beam are mounted as mentioned above, with the mounting plate for the guides affixed inside the open end of barrel 30, which may have a U-shaped guard 31 to protect these parts by partially enclosing them. The barrel is attached to extension 37 of chamber 32, which is closed at the other end by the meter held snugly against it by cap 33. Affixed to the under side of the chamber is handle 34 shaped to provide a pistol grip. Tube V-1 can be seen projecting downward from the chamber into this handle, while tube V-2 and lamp B are present in the body of the chamber with the internal end of the beam passing between them. The remaining circuit elements and the wiring are omitted from these views for simplicity; leads to the power source and to the recorder, if any, pass out from the bottom end of the handle through grommet 35. Coil L wound on form 12 attached to the beam is clearly visible juxtaposed to permanent magnet PM, which, along with mounting means for B and V-1, is secured to chassis 36 just above the bottom inside wall of the chamber. Beam pivot bearings 40, which preferably are jeweled with sapphire or the like, appear clearly in Figure 4, replacing the schematic fulcrum 9 of Figures 1 and 2. Axle 41 of the beam is supported at the ends by these bearings, which are mounted in screws 42 threaded in nuts 43 held by guides 46 affixed to the inside wall of the chamber. An impervious membrane 44 surrounding the beam is useful to protect it from external corrosive influences, such as liquids in which the end of the apparatus may be immersed. The device has proved particularly useful to measure the tension in recently formed rayon yarn in a coagulant or washing bath. A felt or similar seal 45 about the measuring pin is also useful when measurements are to be taken under the surface of a liquid.

The materials of construction are not particularly critical, although the beam should be formed with as light a structure as possible, which suggests the use of aluminum or a similar metal or alloy to reduce the mass of the moving system. The beam material also should be relatively impermeable to magnetic flux so as to prevent the field of the permanent magnet from influencing the beam position except through interaction with the field set up by coil L. The barrel, extension, chamber, handle, and guard also may be made conveniently of light metal or plastic or other material to minimize the total weight of the device, which is designed to be portable and to be held manually while in use if so desired. The protective membrane and seal may be composed of any suitably resilient materials unattacked by any liquid or vapor that the end of the device may contact while in use. The meter in the end near the holder of the device may be supplemented or replaced by a recorder responsive to changes in conduction of V-1.

Accuracy as close as a few parts per million may be obtained in measurement made by an instrument designed in accordance with this invention. When used with a recorder, it may be suitable for measuring tension in strands traveling longitudinally at hundreds or even thousands of feet per minute. It is instantly adaptable to continuous weighing of materials traveling on a moving belt. Many advantages of these and similar uses and modifications in the construction of this apparatus without a departure from the inventive concept will be apparent to those skilled in the art.

What is claimed:

1. Portable tensiometer comprising a cylindrical housing supplied with a pistol grip, a plurality of non-rotatable guide pins affixed to one end of the housing, a permanent magnet affixed to the inside of the housing, a beam pivotally mounted within the housing, and having a pin-like extension at one end adapted for deflective contact with a strand passing between the pins of the housing, a fixed source of light and a photo-responsive device located inside the housing and flanking the opposite end of the beam, a coil connected to said photo-responsive device and carried adjacent the permanent magnet by the beam adapted to set up a magnetic field interacting with the field of the permanent magnet and of a magnitude dependent upon the degree of transmission of light upon displacement of the beam from between the fixed source of light and the photo-responsive device, whereby the beam is balanced electromagnetically.

2. Yarn tensiometer operable regardless of orientation in space, adapted to measure tension in yarn running in any direction, and comprising a pivotally mounted electromagnetically balanced beam having at one end a non-rotatable pin-like extension, flanking fixed guide pins adapted to bring yarn passing therebetween into deflective contact with the pin-like extension during measurement of tension in the yarn, means for setting up an unvarying magnetic field near the beam, means responsive to deflection of the beam by the yarn and adapted to provide an electrical current dependent in magnitude upon that deflection, and a coil connected to the deflection-responsive means and carried on the beam to set up a corresponding magnetic field in opposition to said unvarying magnetic field and thereby maintain the beam in balance.

3. The tensiometer of claim 2 in which the pin-like extension of the beam has a diameter approximating the diameter of the yarn in deflective contact therewith and the maximum deflection produced by such contact regardless of the yarn tension is of the same order of magnitude as such diameters.

4. Tensiometer comprising a housing, a plurality of parallel pins attached to one end of the housing and adapted to guide a strand by contact, a lamp fixedly mounted inside the opposite end of the housing, a photo-responsive device fixedly mounted inside the housing near the lamp, a permanent magnet attached to the inside of the housing near the inner end of the beam, an electromagnetically balanced beam pivotally mounted inside the housing for rotation in a plane perpendicular to the line joining the points of attachment of the pins, a pin extending from one end of the beam and passing between the pins of the housing, the other end of the beam passing between the lamp and the photo-responsive device, an electrically conductive coil carried by the beam and adapted to produce a magnetic field in opposition to that of the permanent magnet, and means electrically connecting the photo-responsive device and the coil together, whereby the intensity of the field produced by the coil depends upon transmission of light from the lamp past the intervening end of the beam to the photo-responsive device.

References Cited in the file of this patent

UNITED STATES PATENTS

| | | |
|---|---|---|
| 1,826,024 | Roller | Oct. 6, 1931 |
| 2,013,810 | Shimek | Sept. 10, 1935 |
| 2,067,741 | Weckerly | Jan. 12, 1937 |
| 2,141,175 | Dawson | Dec. 27, 1938 |
| 2,159,969 | Furst | May 30, 1939 |
| 2,371,040 | Fisher | Mar. 6, 1945 |
| 2,591,724 | Saxl | Apr. 8, 1952 |
| 2,597,899 | Payne | May 27, 1952 |
| 2,661,623 | Brink | Dec. 8, 1953 |

FOREIGN PATENTS

| | | |
|---|---|---|
| 369,369 | Great Britain | Mar. 24, 1932 |